Jan. 16, 1934.  G. S. PFEIFFER  1,943,395
TELEVISION APPARATUS
Filed Nov. 29, 1929
Fig. I
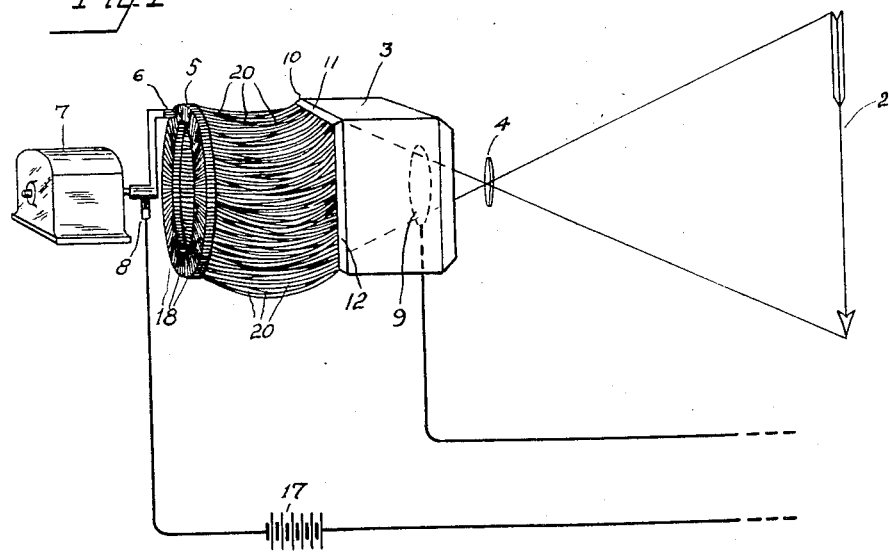
Fig. 2.
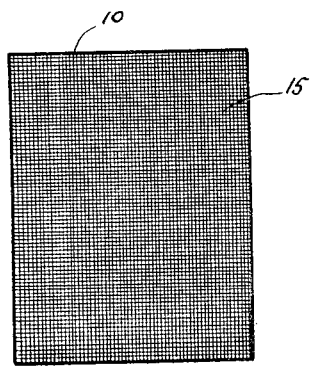
Inventor
George S. Pfeiffer
By G. A. Janochowski
Attorney Patented Jan. 16, 1934

1,943,395

UNITED STATES PATENT OFFICE 1,943,395

TELEVISION APPARATUS

George S. Pfeiffer, Oak Park, Ill., assignor to Kellogg Switchboard and Supply Company, Chicago, Ill., a corporation of Illinois Application November 29, 1929
Serial No. 410,377

4 Claims. (Cl. 178—6)

This invention relates to television systems and more particularly to transmission of images over wire. The present methods as commercially used utilize a photo-electric cell, a projecting lens, a revolving scanning disk, the object of the latter in the so-called "direct" scanning and "beam" scanning methods, as commercially used, being to cause a beam of light originating in a suitable light source to travel successively over successive points of the object and to energize the photo-electric cell in proportion to the intensity of light reflected from each point of the object.

The object of my invention is to render the use of a revolving disk and the auxiliary apparatus connected therewith unnecessary and to permit a greater speed of transmission by subdividing the usual photo-electric cell into a plurality of fractional cells and by connecting each fractional cell to a commutator device forming part of the respective electric circuit.

For a better understanding of my invention reference may be had to the accompanying drawing in which:

Fig. 1 represents schematically my invention and the method of transmission of images made possible by the same;

Fig. 2 illustrates diagrammatically the sensitive surface of the photo-electric cell subdivided into a plurality of fractional cells.

Referring now more in detail to Fig. 1, it will be observed that the arrow 2 symbolizes the object whose image is to be transmitted; 3 designates a photo-electric cell; 4 is a projecting lens; 5 is a commutator device; 6 is a revolving brush travelling over commutator 5 and actuated by motor 7.

The photo-electric cell 3 is provided with the usual collecting electrode 9, and sensitive surface 10, whose external edges 11 and 12 are only visible in Fig. 1. The sensitive surface 10 consists of a plate having a thin coating of a suitable chemical compound, possessing the property of varying the current through the cell with the variations of the illumination to which it is exposed.

For the purpose of subdividing the sensitive surface 10 into a plurality of cells insulated from each other, the chemical coating, which is usually very thin, can be incised lengthwise and crosswise by some sharp instrument so as to form a plurality of little squares 15.

The commutator 5 is subdivided in as many segments 18 as there are cells in the sensitive surface 10, and an individual insulated wire 20 leads from each cell of the sensitive surface 10 to a segment of the commutator 5.

The order in which each cell of the sensitive surface is connected to each segment of the commutator is not essential. The brush 6 revolving with a speed not less than 20 revolutions per second makes contact successively with each segment of commutator 5.

The image of the object 2, having been projected upon the sensitive surface 10 by the lens 4 varies the resistance of each cell 15 in accordance with the intensity of light reflected by each point of the object. Since the photo-electric cell 3 with its collecting electrode 9 and sensitive surface 10 and the commutator 5, form part of an electric circuit, the successive contacts by brush 6 cause a variable current to flow in said electric circuit, the variations of current depending upon variations of resistances of the respective individual sensitive cells, which resistance variations, as had been indicated, depend upon the degree of light and shade of the projected image. In addition to the elements indicated, the respective electric circuit includes also the wiper 8 forming an electrical connection between the brush 6 and the battery 17, as well as amplifying, transmitting, and receiving apparatus not shown in the figure. Any of the receiving methods as commercially used at present can be employed in combination with my sending arrangement.

The above referred to minimum speed of 20 revolutions per second, stands in relation with the well known faculty of the retina of the human eye to retain images one-twentieth of the second after the light rays causing the original excitation of the retina have been eclipsed.

While I have diagrammatically illustrated one form my invention may assume, it is to be understood that changes and modifications may suggest themselves, therefore, I wish to cover all such changes and modifications as come within the spirit and scope of the appended claims.

Having described my invention, what I claim as new and desire to secure by United States Letters Patent is 1. A photo-electric cell including a light sensitive member divided in sections insulated from each other, a commutator having sectors equal in number to the sections of said light sensitive member, each of said sections being electrically connected to one of said commutator sectors, a collecting electrode, and apparatus for successively establishing circuits between the sections of said light sensitive member and said collecting electrode.

2. A television device including a photo-electric cell having a sectional light sensitive member, each section of which is insulated from the other sections thereof and electrically connected to one sector of a commutator, and a collecting electrode, and means for successively including said collecting electrode and sections of said light sensitive member in circuit.

3. A device of the character described including a photo-electric cell having a sectional light sensitive plate, each section of which is insulated from the other sections thereof and electrically connected to one sector of a commutator, and a collecting electrode, a lens for focusing an object upon said light sensitive plate, moving means for successively connecting to the sections of said light sensitive plate, and a circuit including said moving means and said collecting electrode.

4. A television transmitting device including a multi-section light sensitive plate, each section of which is insulated from the other sections thereof and electrically connected to one sector of a commutator, a lens for focusing an object thereon, and a circuit including successively the sections of said plate and a collecting electrode, which circuit is variably affected according to the density of the light focused on the individual sections.

GEORGE S. PFEIFFER.